United States Patent
Belt et al.

(10) Patent No.: US 6,521,694 B2
(45) Date of Patent: Feb. 18, 2003

(54) PROCESS FOR HYDROGENATION OF CARBON-CARBON DOUBLE BONDS OF AN UNSATURATED POLYMER

(75) Inventors: Johannes W. Belt, Geleen (NL); Jacobus A. A. Vermeulen, Geleen (NL); Mike Köstermann, Nieuw-Bergen (NL)

(73) Assignee: DSM N.V., Heerlen (NL)

( * ) Notice: Subject to any disclaimer, the term of this patent is extended or adjusted under 35 U.S.C. 154(b) by 167 days.

(21) Appl. No.: 09/779,699

(22) Filed: Feb. 9, 2001

(65) Prior Publication Data

US 2001/0031824 A1 Oct. 18, 2001

Related U.S. Application Data

(63) Continuation of application No. PCT/NL99/00507, filed on Aug. 9, 1999.
(60) Provisional application No. 60/097,500, filed on Aug. 21, 1998.

(30) Foreign Application Priority Data

Aug. 11, 1998 (NL) ............................................... 1009841
Jul. 9, 1999 (NL) ............................................... 1012554

(51) Int. Cl.[7] ............................................... C08L 29/04
(52) U.S. Cl. ........................ 524/503; 525/326; 525/337
(58) Field of Search ............................... 525/326, 337; 524/503

(56) References Cited

U.S. PATENT DOCUMENTS

| 4,221,872 A | 9/1980 | Lydiate |
| 4,452,950 A | 6/1984 | Wideman |
| 5,314,967 A | 5/1994 | Hergenrother et al. |
| 5,814,709 A | 9/1998 | DeBoer et al. |

FOREIGN PATENT DOCUMENTS

| DE | 35 20 103 | 12/1986 |
| EP | 0 801 079 | 10/1997 |
| WO | 91 06579 | 5/1991 |
| WO | WO 9106579 | * 5/1991 |

OTHER PUBLICATIONS

Yosomiya, T., "Metallization of Polyacrylonitrile by Reduction of Polymer–Incorporated Metal Ions", Angewandte Makromolekulare Chemie: Applied Macromolecular Chemistry and Physics, vol. 197, No. 3400, May 1992, pp 49–58.

Parker, D.K., "A New Process for the Preparation of Highly Saturated Nitrile Rubber in Latex Form", Rubber Chemistry and Technology, vol. 65, No. 1, Mar. 1992, pp 245–248.

Patent Abstracts of Japan, vol. 005, No. 106 (C–062), Jul. 1981, JP 56 045907.

* cited by examiner

Primary Examiner—David W. Wu
Assistant Examiner—William K. Cheung
(74) Attorney, Agent, or Firm—Pillsbury Winthrop LLP

(57) ABSTRACT

The invention relates to a process for hydrogenating carbon-carbon double bonds of an unsaturated polymer by adding to the unsaturated polymer (1) a reducing agent selected from the group comprising hydrazines and hydrazine-releasing compounds, (2) an oxidising compound and (3) a catalyst, wherein the catalyst contains an element from group 13 of the Periodic Table of the Elements.

13 Claims, No Drawings

PROCESS FOR HYDROGENATION OF CARBON-CARBON DOUBLE BONDS OF AN UNSATURATED POLYMER

This is a Continuation of International Application No. PCT/NL99/00507 filed Aug. 9, 1999 which designated the U.S., and that International Application was published under PCT Article 21(2) in English.

This application claims the benefit of U.S. Provisional Application No. 60/097,500, filed Aug. 21, 1998.

The invention relates to a process for hydrogenating carbon-carbon double bonds of an unsaturated polymer by adding to the unsaturated polymer (1) a reducing agent selected from the group comprising hydrazines and hydrazine-releasing compounds, (2) an oxidising compound and (3) a catalyst.

A similar process is known from U.S. Pat. No. 4,452,950. This patent discloses that the reduction of carbon-carbon double bonds of an unsaturated polymer, with the polymer having been brought into the latex form, is carried out in the presence of a metal ion initiator. The metal ion initiator is a metal compound that reacts with hydrazine and is reduced by the hydrazine to a lower valence state. Examples of suitable metal ion initiators are Cu and Fe sulphates. After all reactants are added, the mixture is heated to the reflux temperature of the reaction mixture.

A drawback of this process is that the polymer is crosslinked early in the hydrogenation process and that heavy metals are left behind in the polymer after it is worked up.

The present invention aims to eliminate these drawbacks.

To that end, the invention provides a process in which the catalyst contains an element from group 13 of the Periodic Table of the Elements.

The Periodic Table of the Elements as used in the present application is published on the inside of the cover of the Handbook of Chemistry and Physics, 67th edition, 1986–1987 in accordance with the latest IUPAC nomenclature.

Furthermore, the process of the present invention presents the advantage that the reducing agent and oxidising compound may be present in equimolar amounts to at the most a minor excess relative to the double bonds of the unsaturated polymer to be reduced.

Also, the reaction is catalysed so well that a heating step may be omitted so that the hydrogenation process is much simplified.

Crosslinking of the latex during the hydrogenation process as described in U.S. Pat. No. 4,452,950 is mentioned in U.S. Pat. No. 5,039,737 and U.S. Pat. No. 5,442,009. Both patents disclose a process for breaking up the gel structures through post-treatment with ozone.

From application WO 91-A-06579 it is known to carry out a hydrogenation in the absence of a catalyst. However, this process employs a high hydrazine-to-unsaturated-polymer molar ratio in order to obtain a non-crosslinked polymer. Excess hydrazine subsequently needs to be worked up and destroyed, which from an economics point of view is costly and from an environmental point of view is unacceptable.

The unsaturated polymers that can be hydrogenated via the process of the present invention are composed of 5–100% by weight of a conjugated diene-monomer unit and 95–0% by weight of a vinyl-unsaturated monomer unit. Specific examples of conjugated diene-monomer units are 1,3-butadiene, 2,3-dimethyl butadiene, isoprene and 1,3-pentadiene. Specific examples of vinyl-unsaturated monomer units are nitriles (for example acrylonitrile and methacrylonitrile), vinyl aromatic hydrocarbons (for example styrene, (o-, m-, p-) alkylstyrenes and divinylbenzene) dialkenyl aromatics (for example diisopropenyl benzene), unsaturated carboxylic acids and esters thereof (for example acrylic acid, methacrylic acid, crotonic acid, itaconic acid, maleic acid, methyl acrylate, ethyl acrylate, butyl acrylate, 2-ethylhexyl acrylate and methyl methacrylate), vinylpyridine and vinyl esters (for example vinyl acetate).

The unsaturated polymers may be prepared in different manners for example through emulsion polymerisation, solution polymerisation and bulk polymerisation.

Specific examples of suitable unsaturated polymers are polybutadiene, polyisoprene, styrene-butadiene copolymers (SBR), acrylonitrile-butadiene copolymers (NBR), natural rubber, butadiene-isoprene rubber and terpolymers of butadiene, acrylonitrile and butylacrylate or acrylic acid.

Most preferably NBR is used.

The unsaturated polymers hydrogenated via the process of the present invention are characterised in that their backbone chain contains carbon-carbon double bonds that have an adverse effect on the polymer's thermal, photo-chemical and oxidative stability.

During the hydrogenation, the unsaturated polymers preferably are present in the latex form. The latex form is an aqueous emulsion of polymer, in which sundry additives for example soap and stabilisers may be present. A description of the latex form which is suitable for the hydrogenation of unsaturated polymers via the process of the invention is given in for example U.S. Pat. No. 5,442,009.

The latex of the unsaturated polymer may be hydrogenated as such. The polymer concentration in the latex is in the range of from 1 to 70% by weight, preferably between 5 and 40% wt.

The reducing agent is selected from the group comprising hydrazines and hydrazine-releasing compounds for example hydrazine hydrates, hydrazine acetate, hydrazine sulphate and hydrazine hydrochloride. If the unsaturated polymer is hydrogenated in latex, use is preferably made of hydrazine and hydrazine hydrate. Alternative hydrazine sources may be used if hydrogenation is effected in solution or in the melt and if the alternative hydrazine sources do not adversely effect the stability of the latex.

Latices formed from, for example, non-ionic soaps may be used in combination with hydrazine, hydrazine hydrate, hydrazine hydrochloride and hydrazine sulphate.

The hydrazine or hydrazine releasing compound preferably is present in a molar ratio of from 0.1:1 to 100:1 relative to these carbon-carbon double bonds. Preferably, this ratio lies between 0.8:1 and 5:1, most preferably between 0.9:1 and 2:1.

Oxidising compounds that are suitable for the process of the invention are for example air, oxygen, ozone, peroxides, hydroperoxides, iodine, iodates, hypochlorite and similar compounds. Particularly suitable oxidising compounds are selected from the group consisting of peroxides and hydroperoxides. Most preferably, use is made of hydrogen peroxide.

The oxidising compound is preferably present at a molar ratio of 0.1:1 to 100:1 relative to the carbon-carbon double bonds. More preferably, this ratio is between 0.8:1 and 5:1, most preferably between 0.9:1 and 2:1.

It is preferred for the catalyst be a compound which contains boron (B). Examples of preferred B-containing catalysts are compounds of the general formula

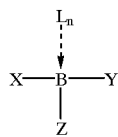

where X, Y and Z are chosen independently of one another from the group comprising R, =O, OR, OOR, $NR_2$, SR, $PR_2$, OC(=O)R and halogen atoms, where R is a H atom or an alkyl, aryl or cycloalkyl group having 1–20 carbon atoms, or a hydrocarbon group having 1–20 C atoms and containing a heteroatom from groups 14, 15, 16 and 17 of the Periodic Table of the Elements, or a polymerchain containing one or more polar groups;

wherein X and Z and optionally Y may form a bridge;

L is an electron-donating ligand, which may be bonded to either X, Y or Z; n=0, 1 or 2.

Examples of suitable electron-donating ligands are for example water, an alcohol, pyridine, bipyridine, triazine, pyrrole compound, an imidazole compound, a pyrazole compound, a pyrimidine compound and a pyrazine compound, an ester, ether, a furan, tetrahydrofuran, pyrans, dioxan, phosphine, phosphide, phosphate, a thio compound or a polymer, for example a polyvinylalcohol or polyethyleneoxide.

Salts of abovementioned boron-containing compounds might also be applied.

Preferably L is chosen from the group comprising diols, polyvinylalcohols and polyethyleneoxide.

It is preferred for the catalyst to be chosen from the group consisting of borates, peroxiborates and boric acid ($H_3BO_3$). More preferably, the catalyst is boric acid. It is most preferred that boric acid is used in combination with a polyvinylalcohol.

The catalyst of the present invention may be combined with the oxidising compound so that less or no oxidising compound needs to be added separately. An example of a catalyst that also has an oxidising effect is peroxiborate.

Another preferred embodiment of the present invention is addition of boric acid to the reaction mixture together with the peroxide or hydroperoxide.

The molar ratio of the catalyst to the carbon-carbon double bonds of the unsaturated polymer is between 1:1000 and 10:1. The ratio preferably is between 1:50 and 1:2.

The order in which the compounds are added for the hydrogenation reaction may in principle be random. Preferably, however, the oxidising compound is added last and in such a way that the concentration of the oxidising compound remains low during the hydrogenation reaction.

The degree of hydrogenation is the percentage of carbon-carbon double bonds that is saturated after the hydrogenation reaction relative to the initial amount of double bonds. The process of the present invention provides polymers that as a rule have a degree of hydrogenation higher than 60%. Preferably, the degree of hydrogenation is higher than 80%. The process is eminently suitable for preparing polymers having a degree of hydrogenation higher than 90%.

The hydrogenation reaction temperature normally is between 0° and 250° C. The temperature preferably is between 20° and 100° C. A reaction temperature between 40° and 80° C. is particularly preferable. Most preferable is a reaction temperature between 60° C. and 80° C., which results in a high catalyst activity, so that low catalyst concentrations can be used.

During hydrogenation in a latex, a minor amount of solvent for the unsaturated polymer may be present. In that case, the amount of solvent may vary between 0 and 20% wt (solvent relative to polymer).

The hydrogenation time normally is between 30 minute and 24 hours. The hydrogenation time preferably is between 1 hour and 12 hours.

The process is illustrated by the following examples without being limited thereto.

In almost all cases the degree of hydrogenation was determined with the aid of $^1$H-NMR in a Bruker 200 MHz instrument. The measurement was conducted on polymer precipitated in isopropanol, that was after precipitation dried with filter paper and immediately dissolved in deuterated chloroform. The degree of hydrogenation was calculated from the ratio of the integrals of the olefinic protons, which are between 5.2 and 5.6 ppm, and the proton adjacent to the nitrile group, being between 2.35 and 2.65 ppm.

In some cases (expressly indicated) the degree of hydrogenation was determined by Raman spectroscopy (using a Spectrum 2000 NIR FT Raman instrument).

The C=C stretch vibrations of the vinyl, cis and trans bonds can be seen in the Raman spectrum between 1600 and 1700 cm$^{-1}$. The C≡N stretch vibration can be seen at 2240 cm$^{-1}$. The peak height ratio between the C=C stretch and the C≡N stretch relative to the blank was used for determining the degree of hydrogenation, it being assumed that the stretch vibration of the nitrile group does not change significantly as a result of the unsaturated polymer being hydrogenated.

EXAMPLE 1

A solution of 0.68g of $H_3BO_3$ (11 mmoles) and 6.31 g of $N_2H_4.1H_2O$ (hydrazine monohydrate, 126 mmoles) in 5.5 g of water were added to a 250-ml glass three-neck flask equipped with a glass top stirrer, cooler and peristaltic pump and containing 25 g of latex, Nysin® 33/3 (a copolymer of 67% butadiene with 33% acrylonitrile) with a polymer content of 25% and containing a total of 77.5 mmoles of carbon-carbon double bonds. A few drops of silicone oil were added as defoamer.

The latex was heated to 40° C. and stirred for some minutes. While the contents were being stirred, 13.30 g of a 30% solution of $H_2O_2$ in water (117 mmoles) were added drop-wise during a period of 6 hours with the aid of the peristaltic pump. On being hydrogenated, the 5 grams of latex were poured into 50 grams of isopropanol. The polymer dissolved completely in chloroform (no gel particles were visible). The degree of hydrogenation, determined by $^1$H-NMR, was 96%.

EXAMPLE 2

Example I was repeated except that the amount of hydrazine was varied as shown in Table 1. The $H_2O_2$ was added drop-wise in an equimolar amount relative to hydrazine. All samples dissolved completely in chloroform (no gel particles were visible).

TABLE 1

Degree of hydrogenation as a function of the amount of hydrazine.

| Ex. | Hydrazine monohydrate (grams) | $H_2N—NH_2.H_2O$ equivalents relative to C=C | Degree of hydrogenation (%) |
| --- | --- | --- | --- |
| II.1 | 3.1 | 0.8 | 70 |
| II.2 | 3.9 | 1.0 | 85 |

TABLE 1-continued

Degree of hydrogenation as a function of the amount of hydrazine.

| Ex. | Hydrazine monohydrate (grams) | $H_2N—NH_2.H_2O$ equivalents relative to C=C | Degree of hydrogenation (%) |
|---|---|---|---|
| II.3 | 4.3 | 1.1 | 89 |
| II.4 | 4.7 | 1.2 | 93 |
| I | 6.31 | 1.6 | 96 |

EXAMPLE III

Example I was repeated except that the $H_2O_2$ was added in 12 hours, with two different amounts of hydrazine. Slow addition of hydrogenperoxide gives an increase in the degree of hydrogenation.

All samples dissolved completely in chloroform (no gel particles visible).

TABLE 2

Degree of hydrogenation at 12 hours of reaction time and variable amount of hydrazine.

| Ex. | Hydrazine monohydrate (grams) | $H_2N—NH_2.H_2O$ equivalents relative to C=C | time (hours) | Degree of hydrogenation (%) |
|---|---|---|---|---|
| III.1 | 3.9 | 1.0 | 12 | 87 |
| III.2 | 4.7 | 1.2 | 12 | 97 |

EXAMPLE IV

Example I was repeated except that 4.68 grams of $N_2H_4.1H_2O$ (hydrazine monohydrate) and 0.16 grams of boric acid were added, and the reaction was carried out at different temperatures. Low amounts of hydrazine monohydrate and boric acid give a lower degree of hydrogenation. The degree of hydrogenation is increased by raising the temperature of the reaction. All samples dissolved in chloroform.

TABLE 3

Degree of hydrogenation as a function of temperature

| Ex | Temperature (° C.) | Degree of hydrogenation (%) |
|---|---|---|
| IV. 1 | 40 | 60 |
| IV. 2 | 70 | 90 |

EXAMPLE V

Example I was repeated except that the amount of boric acid was varied. Increase of the amount of boric acid, gives an increase in the degree of hydrogenation. All samples dissolved completely in chloroform (no gel particles visible).

TABLE 4

Degree of hydrogenation as a function amount of boric acid added.

| Ex | Boric acid (grams) | Degree of hydrogenation (%) |
|---|---|---|
| V.1 | 0 | 60 |
| V.2 | 0.17 | 80 |
| V.3 | 0.34 | 85 |
| V.4 | 0.51 | 96 |
| V.5 | 0.85 | 93 |

EXAMPLE VI

Example IV.1 was repeated, except that boric acid was dissolved in the hydrogenperoxide solution, and added to the latex together with the hydrogenperoxide.

The degree of hydrogenation increased considerably upon premixing of boric acid with the hydrogenperoxide.

TABLE 5

Effect of premixing of boric acid with hydrogenperoxide.

| Ex | Boric acid premixed with $H_2O_2$ | Degree of hydrogenation (%) |
|---|---|---|
| IV.1 | no | 60 |
| VI.1 | yes | 91 |

EXAMPLE VII

Example IV.1 was repeated, except that ligands L were added to the latex with the boric acid. Addition of ligands increases the catalytic activity of boric acid.

TABLE 6

Addition of ligands L to the reaction mixture.

| Ex. | Ligand L | gram | Degree of hydrogenation (%) |
|---|---|---|---|
| IV.1 | no | — | 60 |
| VII.1 | ethanol | 0.12 | 70 |
| VII.2 | 1-phenyl-1,2-ethanediol | 0.34 | 70 |
| VII.3 | polyethyleneglycol, OH-terminated, Mw 35.000 | 0.15 | 83 |
| VII.4 | polyvinylalcohol, 98% hydrolysed, Mw 20.000 | 0.15 | 93 |

Comparative Experiment A

An amount of $N_2H_4.1H_2O$ (hydrazine monohydrate), as shown in Table 1, dissolved in 5.5 grams of water, were added to a 250-ml glass three-neck flask equipped with a glass top stirrer, cooler and peristaltic pump and charged with 25 g of latex, Nysin 33/3 with a polymer content of 25%. A few drops of silicone oil were added as defoamer.

The hydrogenation reaction was carried out as in Example I, with $H_2O_2$ in a 30% solution of $H_2O_2$ in water being added drop-wise with the aid of the peristaltic pump in an equimolar amount relative to hydrazine.

All samples dissolved completely in chloroform (no gel particles were visible).

TABLE 7

Degree of hydrogenation as a function of the
amount of hydrazine required in the absence of boric acid

| Comp. ex. | Hydrazine monohydrate (grams) | $H_2N$—$NH_2.H_2O$ equivalents relative to C=C | Degree of hydrogenation (%) |
|---|---|---|---|
| A.1 | 3.9 | 1.0 | 55 |
| A.2 | 5.9 | 1.5 | 67 |
| A.3 | 7.6 | 2.0 | 80 |
| A.4 | 9.8 | 2.5 | 94 |

Comparative Experiment B 4.3 g of $N_2H_4.1H_2O$ (hydrazine monohydrate, 1.1 equivalent relative to C=C), followed by 0.0018 grams of $CuSO_4.5H_2O$ in 5 grams of water were added to a 250-ml glass three-neck flask equipped with a glass top stirrer, cooler and peristaltic pump and charged with 25 g of latex, Nysin 33/3 with a polymer content of 25%. A few drops of silicone oil were added as defoamer. The latex was heated to 40° C. and stirred for some minutes. While the contents were being stirred, 10 g of a 30% solution of $H_2O_2$ in water were added drop-wise with the aid of the peristaltic pump. During the hydrogenation, 1-gram latex samples were taken and these were precipitated in 10 grams of isopropanol. The polymer's solubility was directly measured visually in chloroform.

TABLE 8

Solubility as a function of $H_2O_2$ added and
degree of hydrogenation

| Ex. | $H_2O_2$ added (%) | Degree of hydrogenation (%)$^{x2}$ | Solubility |
|---|---|---|---|
| B.1 | 13.9 | 14 | soluble |
| B.2 | 33 | 28 | soluble |
| B.3 | 47 | — | gelled |
| A.4 | 100 | 71 | gelled |

The polymers in Experiments B.3 and B.4 were subjected to a Soxhlet extraction with chloroform, with the aid of which the gel content was determined. The sample in Experiment B.3 contained 70% gel and the sample in Experiment B.4 contained more than 90%. The degree of hydrogenation in Experiment B.4 was determined by Raman spectrometry.

Comparative Example C 5.8 g of $N_2H_4.1H_2O$ (hydrazine monohydrate, 1.5 equivalent relative to C=C), followed by an amount of $CuSO_4.5H_2O$ as indicated in Table 7 in 5 gram of water were added to 250-ml glass three-neck flask equipped with a glass top stirrer, cooler and peristaltic pump and charged with 25 g of latex, Nysin 33/3 with a polymer content of 25%. The latex was heated to 50° C. and stirred for some minutes. While the contents were being stirred, 13.1 g of a 30% solution of $H_2O_2$ in water were added drop-wise with the aid of the peristaltic pump. After the hydrogenation, 1-gram latex samples were taken and these were precipitated in 10 grams of isopropanol. The polymer's solubility was directly measured visually in chloroform (see Table 7).

TABLE 9

Solubility as a function of degree of hydrogenation

| Comp. ex. | $CuSO_4.5H_2O$ (grams) | Degree of hydrogenation (%)$^{x1}$ | Solubility |
|---|---|---|---|
| C.1 | 0.0009 | 80 | gelled |
| C.2 | 0.0019 | 89 | gelled |
| C.3 | 0.0095 | 55 | gelled |
| C.4 | 0.017 | 32 | gelled |

The polymer obtained in each experiment was subjected to a Soxhlet extraction with chloroform. The gel content was found to be higher than 60% in all cases. The degree of hydrogenation of the samples in Comparative Example C was determined by Raman spectrometry.

What is claimed is:

1. Process for hydrogenating carbon-carbon double bonds of an unsaturated polymer by adding to the unsaturated polymer (1) a reducing agent comprising hydrazines or hydrazine-releasing compounds, (2) an oxidizing compound and (3) a catalyst, wherein the catalyst contains an element from group 13 of the Periodic Table of the Elements.

2. Process according to claim 1, wherein the catalyst is a compound which contains boron.

3. Process according to claim 2, wherein the catalyst is a compound of the general formula

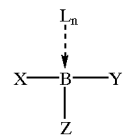

wherein X, Y and Z are chosen independently of one another from the group comprising R, =O, OR, OOR, $NR_2$, SR, $PR_2$, OC(=O)R and halogen atoms, where R is a H atom or an alkyl, aryl or cycloalkyl group having 1–20 carbon atoms, or a hydrocarbon group having 1–20 C atoms and containing a heteroatom from groups 14, 15, 16 and 17 of the Periodic Table of the Elements, or a polymerchain containing one or more polar groups; wherein X and Z and optionally Y may form a bridge;

L is an electron-donating ligand, which may be bonded to either X, Y or Z;

n=0, 1 or 2.

4. Process according to claim 3, wherein the catalyst is boric acid.

5. Process according to claim 4, wherein boric acid is used in combination with a polyvinylalcohol.

6. Process according to claim 1, wherein the molar ratio of the catalyst to the carbon-carbon double bonds of the unsaturated polymer is between 1:50 and 1:2.

7. Process according to claim 1, wherein the oxidizing compound is selected from the group consisting of peroxides and hydroperoxides.

8. Process according to claim 4, wherein the boric acid is added to the reaction mixture together with the peroxide or hydroperoxide.

9. Process according to claim 7, wherein the oxidizing agent is hydrogen peroxide.

10. Process according to claim 1, wherein the molar ratio of oxidising compound to carbon-carbon double bonds is between 0.9:1 and 2:1.

11. Process according to claim 1, wherein the molar ratio of hydrazine or hydrazine releasing compound to carbon-carbon double bonds is between 0.9:1 and 2:1.

12. Process according to claim 1, wherein the reducing agent is selected from the group consisting of hydrazine and hydrazine hydrates.

13. Process according to claim 1, wherein the unsaturated polymer is present in the latex form.

* * * * *